United States Patent
Ando et al.

(10) Patent No.: US 7,599,564 B2
(45) Date of Patent: Oct. 6, 2009

(54) JPEG-COMPRESSED FILE CREATING METHOD

(75) Inventors: Shigeo Ando, Tokyo (JP); Yasuo Maeda, Tokyo (JP); Mitsunobu Yoshinaga, Tokyo (JP); Kanae Ikeda, Tokyo (JP); Satoshi Minami, Tokyo (JP); Kyosuke Yoshimoto, Tokyo (JP); Aki Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 10/548,439

(22) PCT Filed: Mar. 12, 2004

(86) PCT No.: PCT/JP2004/003344

§ 371 (c)(1),
(2), (4) Date: Aug. 8, 2006

(87) PCT Pub. No.: WO2004/082260

PCT Pub. Date: Sep. 23, 2004

(65) Prior Publication Data

US 2007/0036451 A1    Feb. 15, 2007

(30) Foreign Application Priority Data

Mar. 13, 2003  (JP)  ............................. 2003-067891

(51) Int. Cl.
*G06K 9/36* (2006.01)

(52) U.S. Cl. ..................................................... 382/232

(58) Field of Classification Search ......... 382/232–233, 382/234–236, 238–240, 244–251; 348/384.1, 348/390.1, 394.1–395.1, 400.1–416.1, 420.1–421.1, 348/424.2; 358/426.01, 426.05–426.08, 358/426.11–426.16; 375/240, 240.01–240.08, 375/240.12–240.24

See application file for complete search history.

(56) References Cited

U.S. PATENT DOCUMENTS 5,333,212 A * 7/1994 Ligtenberg .................. 382/250
5,699,457 A * 12/1997 Adar et al. .................. 382/239

(Continued)

FOREIGN PATENT DOCUMENTS

JP        2-202268 A      8/1990

(Continued)

*Primary Examiner*—Jose L Couso
(74) *Attorney, Agent, or Firm*—Birch, Stewart, Kolasch & Birch, LLP

(57) ABSTRACT

Image feature values Va and Vb are derived from image data, coefficients C and D are determined based on the image feature values Va and Vb, and an approximate expression expressed with the file size Sfj of the JPEG compression file and the quantization data coefficient value Aqt is derived. Next, by designating the file size of a desired predetermined JPEG compression file based on the approximate expression, the quantization data coefficient value Aqt is derived, and a first quantization table as a reference is multiplied by the quantization data coefficient value Aqt, whereby a second quantization table is obtained. Then, using the second quantization table, the image data is actually JPEG-compressed.

8 Claims, 6 Drawing Sheets

U.S. PATENT DOCUMENTS

| | | | |
|---|---|---|---|
| 6,285,793 B1 * | 9/2001 | Hua | 382/239 |
| 6,314,208 B1 * | 11/2001 | Konstantinides et al. | 382/239 |
| 6,349,151 B1 * | 2/2002 | Jones et al. | 382/251 |
| 6,549,674 B1 * | 4/2003 | Chui et al. | 382/240 |
| 6,600,837 B1 * | 7/2003 | Shimura et al. | 382/239 |
| 6,807,308 B2 * | 10/2004 | Chui et al. | 382/240 |
| 6,978,049 B2 * | 12/2005 | Chui et al. | 382/240 |
| 7,120,303 B2 * | 10/2006 | Mitchell et al. | 382/239 |
| 7,206,451 B2 * | 4/2007 | Chui et al. | 382/232 |

FOREIGN PATENT DOCUMENTS

| | | |
|---|---|---|
| JP | 4-35268 A | 2/1992 |
| JP | 8-79762 A | 3/1996 |
| JP | 9-168149 A | 6/1997 |
| JP | 10-23413 A | 1/1998 |
| JP | 10-66004 A | 3/1998 |
| JP | 2002-359695 A | 12/2002 |

* cited by examiner

Fig. 6

|  | Desired file size (KB) | |
|---|---|---|
|  | 4.49 | 3.23 |
|  | JPEG compression file size(KB) | |
| Sample1 | 4.59 | 3.39 |
| Sample2 | 4.54 | 3.32 |
| Sample3 | 4.33 | 3.14 |
| Sample4 | 4.33 | 3.13 |
| Sample5 | 4.22 | 3.14 |
| Sample6 | 4.61 | 3.30 |
| Sample7 | 4.57 | 3.26 |
| Sample8 | 4.04 | 3.01 |
| Sample9 | 4.40 | 3.22 |
| Sample10 | 4.48 | 3.31 |
| Sample11 | 4.47 | 3.17 |
| Sample12 | 4.72 | 3.33 |
| Sample13 | 4.49 | 3.23 |

JPEG-COMPRESSED FILE CREATING METHOD

TECHNICAL FIELD

The present invention relates to JPEG-compression-file generation methods for generating JPEG compression files of a predetermined file size, JPEG-compression-file generation devices therefor, and image processing devices.

BACKGROUND ART

Conventionally, when a JPEG compression file is generated in a JPEG-compression-file device, the file size of the generated JPEG compression file is required to be equal to a predetermined file size designated in advance.

In generating JPEG compression files by compressing image data, quantization tables are used. However, if fixed tables are adopted as the quantization tables, more than twice the difference in the file size of the generated JPEG compression files easily arises between simple image data and complicated image data.

Therefore, as a conventional technology, a technology is described in the patent document below, in which a reference quantization table is prepared in advance, which is converted in accordance with the type of the image data to be compressed, and the image data compression process is performed using the converted quantization table.

Japanese Patent Laid-Open No. 66004/1998

The conventional technology is a technology in which, in order to get a JPEG compression file of a predetermined file size, a portion of image data before compression is once JPEG-compressed, and, given that the size of the resulting compressed data is an evaluation value, a quantization table for JPEG-compressing the whole image data is calculated based on the evaluation value.

Specifically, when a portion of data is JPEG-compressed, a fixed quantization table prepared in advance is used. Next, a resulting data size in a case in which a portion of image data is JPEG-compressed according to the fixed quantization table is calculated as an evaluation value H.

Next, based on the evaluation value H, a factor q of the quantization table for JPEG-compressing the whole image data is calculated according to the calculation formula $q = M \times H - N$. Here, M and N are predetermined coefficients, which are determined in advance by experiment for each of desired file sizes.

In addition, in the embodiment of the conventional technology described above, the coefficient M, in the calculation formula $q = M \times H - N$, tends to increase, as the evaluation value H increases. Therefore, a method of switching the coefficient M between two values M1 and M2 in accordance with the evaluation value H is adopted.

DISCLOSURE OF THE INVENTION

In a JPEG-compression-file generation device related to the conventional technology described above, however, before finally performing JPEG compression for the whole image data, the JPEG compression process must be performed for a portion of the image, and therefore the JPEG process has been required twice, whereby considerable time has been required for actually creating the JPEG compression file, and the process itself has been complicated.

Moreover, because the values of the coefficients M and N have been calculated in advance by experiment for each of the desired file sizes of JPEG compression files, a problem has been that, when a plurality of desired file sizes must be designated, an enormous amount of experiment must be performed.

Furthermore, although in the calculation formula described above, the coefficient M depends on the evaluation value H, in the conventional technology, dependence on the evaluation value H is only compensated by the method of merely switching between two values, so that the dependence on the evaluation value H, cannot be accurately reflected, and as a consequence, it has been impossible to calculate a factor q in the quantization table with high accuracy.

Accordingly, there has been a large difference between the size of a JPEG compression file generated according to the quantization table calculated based on the factor q, and the file size desired before processing.

Therefore, it is an object of the present invention to provide a JPEG-compression-file generation method, a JPEG-compression-file generation device, and an image processing device, in which JPEG compression files of a predetermined size can be generated by a simple and rapid process with high accuracy.

In order to achieve the above-described object, in terms of a JPEG-compression-file generation method for generating a JPEG compression file from image data, using a second quantization table obtained based on a quantization data coefficient value and on a first quantization table as a reference, the JPEG-compression-file generation method relevant to the present invention includes: (a) a step of deriving, from the image data before JPEG compression, image feature value; (b) a step of determining predetermined coefficient values based on the image feature value; and (c) a step of deriving the quantization data coefficient value by, with respect to a relational expression, which includes the quantization data coefficient value and the predetermined coefficients, for expressing the file size of a JPEG compression file, using the values determined in the step (b) for the predetermined coefficients and designating a desired file size as the file size of the JPEG compression file.

BRIEF DESCRIPTION OF DRAWINGS

FIG. 6 is a diagram illustrating results of the JPEG-compression-file generation method according to the present invention, that has been performed.

BEST MODE FOR CARRYING OUT THE INVENTION

Hereinafter, the present invention will be specifically described according to drawings illustrating embodiments thereof.

Embodiment 1

Figure 1:
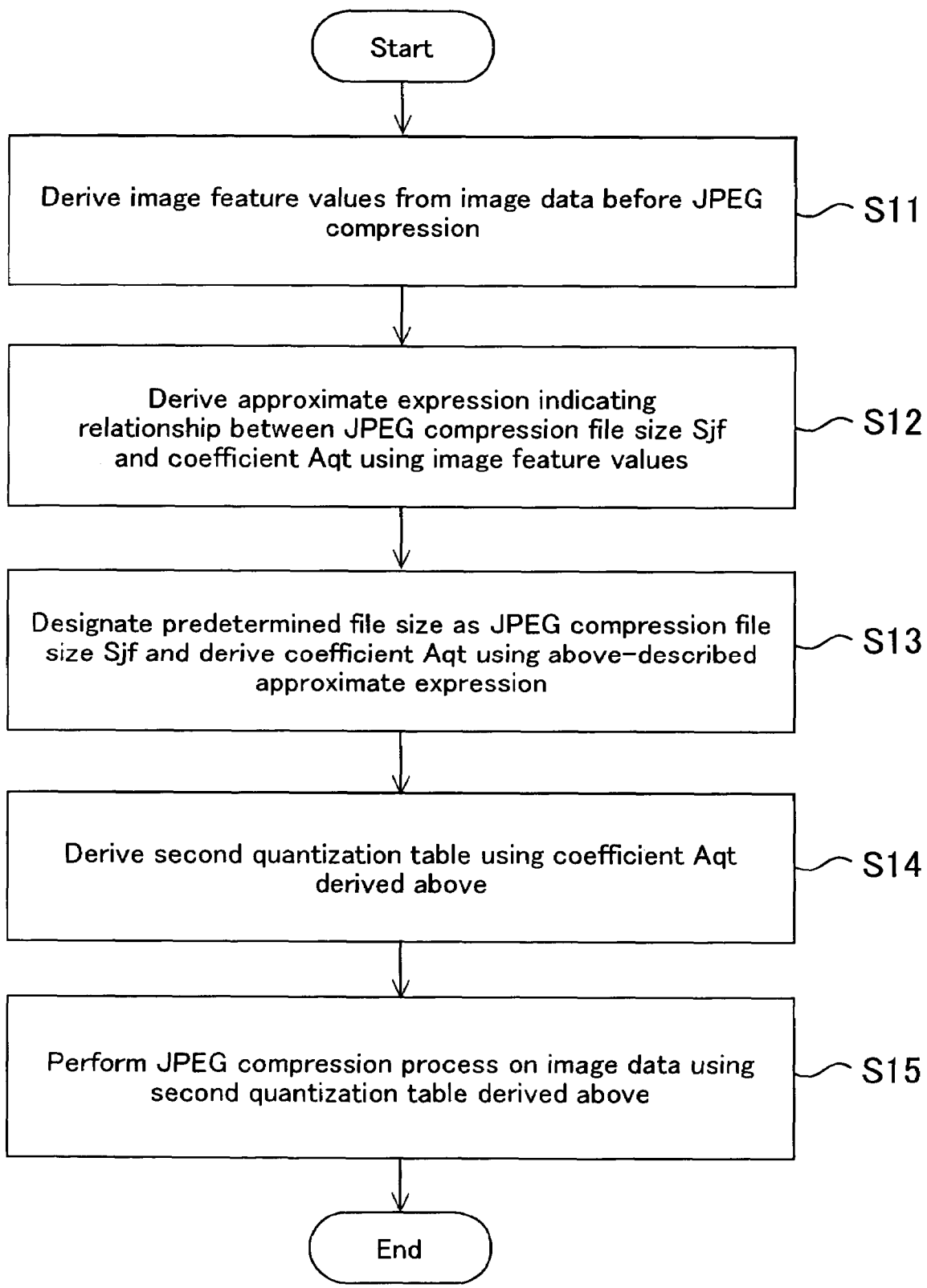
FIG. 1 is a flowchart illustrating procedures of a JPEG-compression-file generation method relevant to the present invention.

FIG. 1 is a flowchart for illustrating procedures of a JPEG compression process in a JPEG-compression-file generation method relevant to the present embodiment. The process can be performed in a computer programmed in advance.

In FIG. 1, step S11 is a procedure for deriving image feature values from image data before JPEG compression.

Next, step S12 is a procedure deriving, based on the image feature values derived in step S11, an approximate expression indicating the relationship between the file size Sjf of the JPEG compression file where the image data is used as input data, and a quantization data coefficient value (hereinafter referred to simply as a coefficient value) Aqt for a first quantization table as a reference.

More specifically, in step S12, a coefficient C and a coefficient D in the following approximate expression prepared in advance are determined based on the image feature values derived in step S11.

$$Sjf = (\text{coefficient} C) \times Aqt^{(\text{coefficient} D)} \quad (1)$$

Here, according to the derived approximate expression (1), if the file size Sjf, for example, is determined, the coefficient value Aqt can be uniquely derived.

Next, step S13 is a procedure in which a desired predetermined value of the file size is designated as Sjf in the approximate expression (1), and the coefficient value Aqt is derived according to the approximate expression (1).

Next, step S14 is a procedure in which a second quantization table is derived by multiplying the first quantization table as a reference by the coefficient value Aqt derived in step S13.

At the end, step S15 is a procedure for generating a JPEG compression file of a desired predetermined file size by performing the JPEG compression process on image data using the second quantization table.

Hereinafter, specific procedures and adequacy of the approximate expression (1) will be described.

Figure 2:
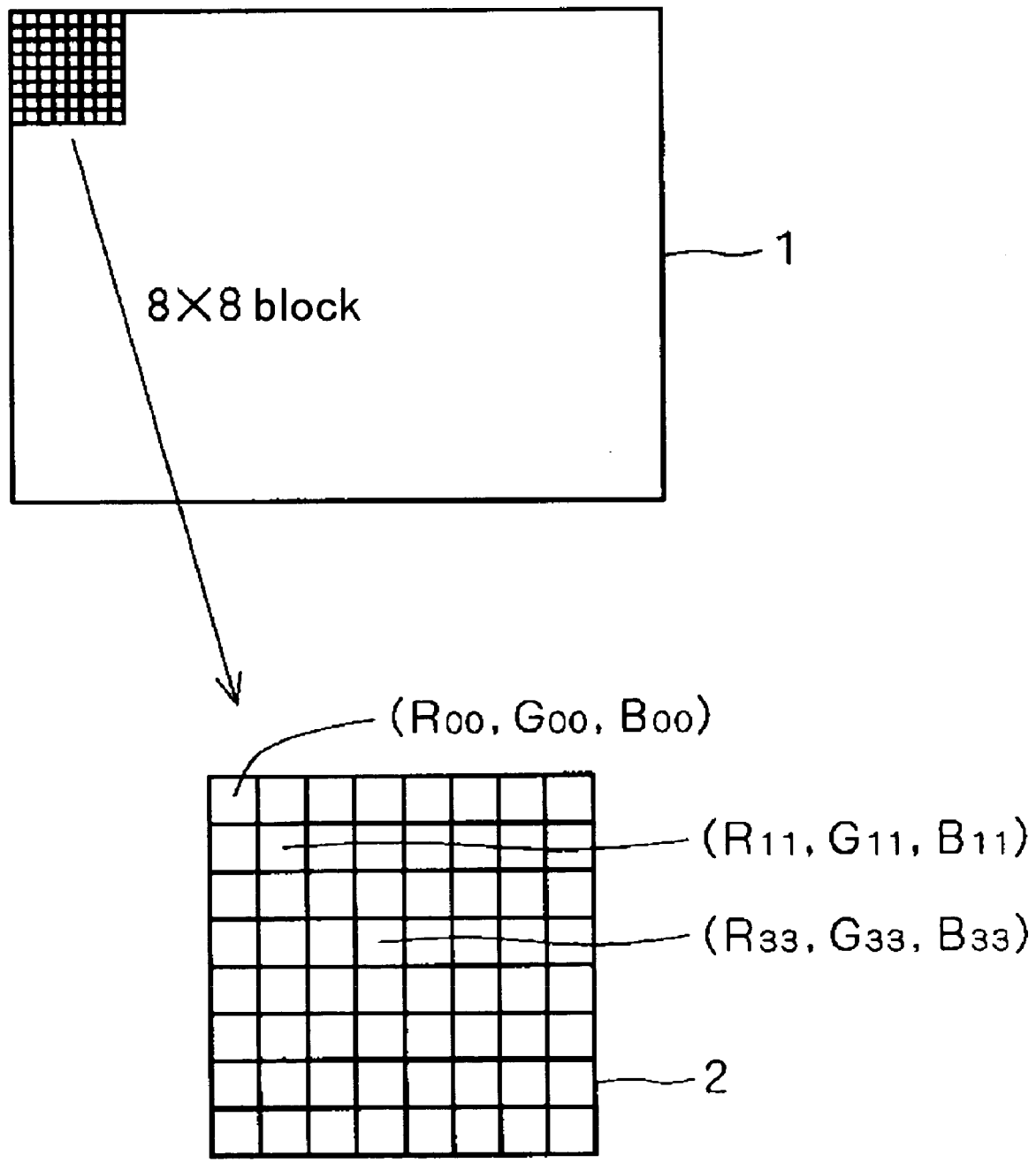
FIG. 2 is a diagram for illustrating a derivation method of image feature values.

Firstly, the derivation method for image feature values in step S11 in FIG. 1 will be described. FIG. 2 is a diagram for describing that image data 1 is divided into unit blocks 2, each including 8 [dots]×8 [dots].

Meanwhile, in the JPEG-compression-file generation device in the embodiment of the present invention, the first image feature value Va and the second image feature value Vb are to be derived according to the equations described below. In addition, the image data 1 before compression is in RGB format.

$$Va = \Sigma(|G_{00} - G_{00}|)_i / (\text{unit block count} \times 3) \quad (2)$$

$$Vb = \Sigma\{|G_{00} - G_{33}| + (|R_{00} - R_{33}| + |B_{00} - B_{33}|)/2\}_i / (\text{unit block count} \times 3) \quad (3)$$

Here, as illustrated in FIG. 2 (the most upper-left pixel is located in line 0 and row 0), $G_{00}$, $R_{00}$, and $B_{00}$ are the pixel values of the pixel (green, red, and blue) located in line 0 and row 0 in each unit block 2. Moreover, $G_{11}$ is a green pixel value of the pixel located in line 1 and row 1 in each unit block 2. Furthermore, as illustrated in FIG. 2, $G_{33}$, $R_{33}$, and $B_{33}$ are the pixel values of the pixel (green, red, and blue) located in line 3 and row 3 in each unit block 2.

Furthermore, in the foregoing equations (2) and (3), $\Sigma$ is the sum in terms of the number i of the divided unit blocks 2. Therefore, if the image data 1 is composed of an image with horizontal 160 [dots]×vertical 120 [dots], for example, the sum of $|G_{00} - G_{11}|$ for 300 unit blocks 2 is calculated. In addition, the number of the unit blocks is 300 in the example described above.

As illustrated in the equations (2) and (3), the first image feature value Va is expressed using the pixel-value difference between two pixels (understood as two pixels at a first distance range) that are 1 dot horizontally apart, and 1 dot vertically apart. Meanwhile, the second image feature value Vb is expressed using the pixel-value difference between two pixels (understood as two pixels at a second distance range) that are 3 dots horizontally apart, and 3 dots vertically apart.

Here, the JPEG compression process is performed so that luminance components and chrominance components are separated. In particular, a large amount of data is assigned to the luminance components. And, because the color highly correlated with luminance components is green, in the foregoing equation (2), the calculation is performed using only G-pixel values.

In addition, pixel values of R and B, though not to the extent of G-pixel values, affect JPEG files, so that the equation (3) is derived using pixel values of R, G, and B. Moreover, in the foregoing equation (3), "2" for division in the numerator is introduced, because R and B have less influence on luminance components compared to G highly correlated with luminance components.

According to the above descriptions, it is understood that the first image feature value Va calculated according to the equation (2) indicates high frequency components, which express rapid change in pixel values of the image data 1. Meanwhile, it is understood that the second image feature value Vb calculated according to the equation (3) indicates lower frequency components, which express slower change in pixel values of the image data 1, compared to the first image feature value Va.

In addition, as can be expected from the equations (2) and (3), because most of the derivation of the image feature values Va and Vb is addition of the absolute value of the pixel-value difference between two pixels, the image feature values Va and Vb can be derived according to extremely simple calculations.

Moreover, the "frequency" used here means the frequency when change in pixel values is deemed as a wave.

Next, the procedure in step S13 will be described.

In step S13, a desired predetermined file size of JPEG compression files is externally designated as Sjf in the approximate expression (1), and the coefficient value Aqt is derived according to the approximate expression (1) derived in step S12 and the predetermined file size. In step S13, the following conversion of Sjf is performed, and the converted file size Sjf' is substituted for Sjf in the approximate expression (1), so that the coefficient value Aqt is derived.

$$Sjf' = \{(\text{a predetermined file size } Sjf \text{ to be designated}) - (\text{the size of a portion of the data independent of the image data})\} \times 160 \times 120 / (\text{the number of horizontal dots of an actual image} \times \text{the number of vertical dots of the actual image}) \quad (4)$$

In the equation (4) described above, Sjf is converted to a file size of an image whose size is 160 dots×120 dots by "×160×120/(the number of horizontal dots of an actual image×the number of vertical dots of the actual image)".

Therefore, by the conversion described above, regardless of horizontal and vertical sizes of the image, the JPEG compression process can be performed according to the identical approximate expression (1). More specifically, when image data 1 of different sizes is JPEG-compressed, if the conversion is not performed, respective approximate expressions for image data 1 of different sizes must be prepared. According to the conversion, image data 1 of different sizes is always converted as the image data 1 of the same size (in this case, image data 1 of the size 160×120), so that only one approximate expression (1) is required to be prepared, and image data 1 of different sizes can be processed according to the same approximate expression (1).

Meanwhile, in the expression (5), according to "(the file size of the JPEG compression file before conversion)−(the size of a portion of the compression-file data independent of the image data)", Sjf is converted to the file size from which the size of the portion of the compression-file data independent of the image data before compression has been eliminated.

Therefore, according to the conversion, a JPEG compression file of the size that is more accurately close to the desired file size can be generated. More specifically, as described later, the coefficients C and D in the approximate expression (1) are values that depend on the feature values of the image data 1. Accordingly, if the size of a portion of data independent of the image data 1 before compression, such as the size of the quantization table, is included in the file size Sjf, the approximation accuracy in the approximate expression (1) diminishes. Therefore, by using as Sjf the difference between the designated file size and the size of a portion of the data independent of the image data 1 according to the above-described conversion, the approximate expression is converted to the relationship between coefficients C and D that depend on image features of the image data 1, and Sjf' also depend on image features of the image data 1, so that accuracy in the approximate expression (1) can be enhanced.

Next, adequacy of the approximate expression (1) will be described.

Figure 3:
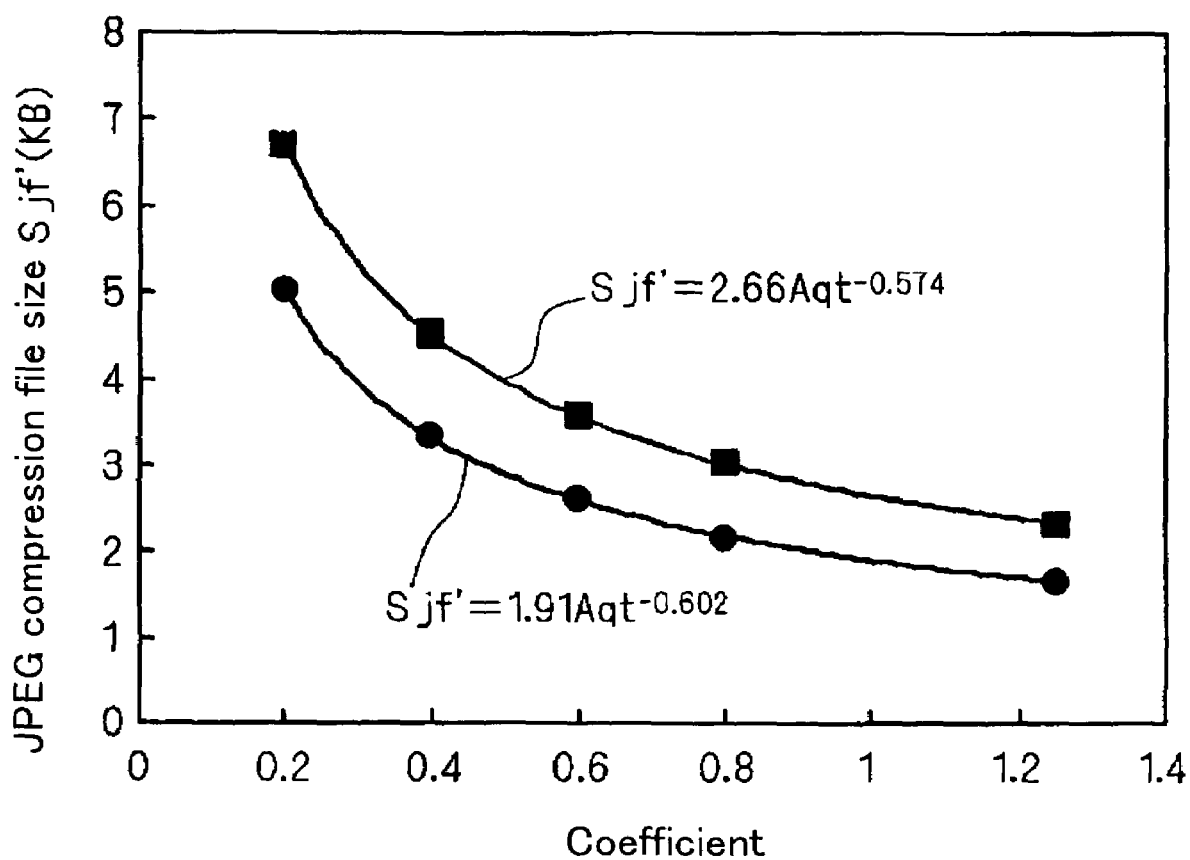
FIG. 3 is a diagram for illustrating adequacy of approximate expressions indicating the relation between a coefficient value and a file size.

The approximate expression (1) is an experimental formula derived from experimental results described below. FIG. 3 illustrates the experimental results expressing the relation between the coefficient value Aqt and the file size Sjf' of the JPEG compression file after conversion in the actual JPEG compression process.

In FIG. 3, the vertical axis represents the JPEG compression file size Sjf' after conversion, and the horizontal axis represents the coefficient value Aqt. The experiment has been performed in a manner in which two types of uncompressed image data 1 with horizontal 640 [dots]×vertical 480 [dots] are actually JPEG-compressed for several artificially designated coefficient values Aqt.

In the figure, the experimental results with respect to the two types of image data 1 are marked off with square marks and round marks. The experiment has been performed in a manner in which five coefficient values Aqt are designated, JPEG compression is actually performed for the designated coefficient values Aqt, the file size Sjf after compression is measured, and the Sjf' is calculated by converting the Sjf according to the equation (4).

In the experiment illustrated in FIG. 3, for the first quantization tables as references, in other words, for a first luminance signal quantization table and a first chrominance signal quantization table, Table K.1 and Table K.2 in Annex K of ISO/IEC 10918-1:1993(E) are used, respectively.

Meanwhile, approximated curves obtained by performing the least-square method with respect to the two types of marks shown in FIG. 3 are drawn in solid line in FIG. 3. In addition, function expressions of the approximated curves obtained in the above-described approximation process are also included in FIG. 3.

Thus, it turns out that the experimental formulas derived from the experimental results illustrated in FIG. 3 can be approximated in high accuracy by the function form of the equation (1).

Moreover, in the function forms included in FIG. 3, for one image, coefficient C is 2.66, and the coefficient D is −0.574, while for the other image, the coefficient C is 1.91, and the coefficient D is −0.602, whereby it also turns out that the coefficient C and the coefficient D largely change their values depending on the type of the image data 1.

According to this, it can be presumed that the coefficients C and D depend on the image feature values Va and Vb indicating features of images. In other words, it can be presumed that the coefficients C and D can be expressed as functions of the image feature values Va and Vb.

Therefore, if the function forms of the coefficients C and D, depending on the image feature values Va and Vb, are appropriately selected, and the image feature values Va and Vb obtained in step S12 in FIG. 1 are substituted for Va and Vb in the function forms, then the appropriate coefficients C and D in accordance with the image data 1 can be obtained, and consequently the approximate expression (1) with high accuracy can be derived.

In the JPEG-compression-file generation method according to the invention, the following equations, which have been statistically derived based on a plurality of image data files 1, are adopted as function forms of the coefficients C and D.

$$C = 0.222 \times Va + 0.033 \times Vb + 0.499 \quad (5)$$

$$D = 0.019 \times Va - 0.001 \times Vb - 0.676 \quad (6)$$

As can be understood from the above equations (5) and (6), the contribution of the image feature value Vb to the coefficient D is smaller than the other terms.

Next, according to experimental results illustrated in FIGS. 4 and 5, it will be described that the equations (5) and (6) are in appropriate function forms.

Figure 4:
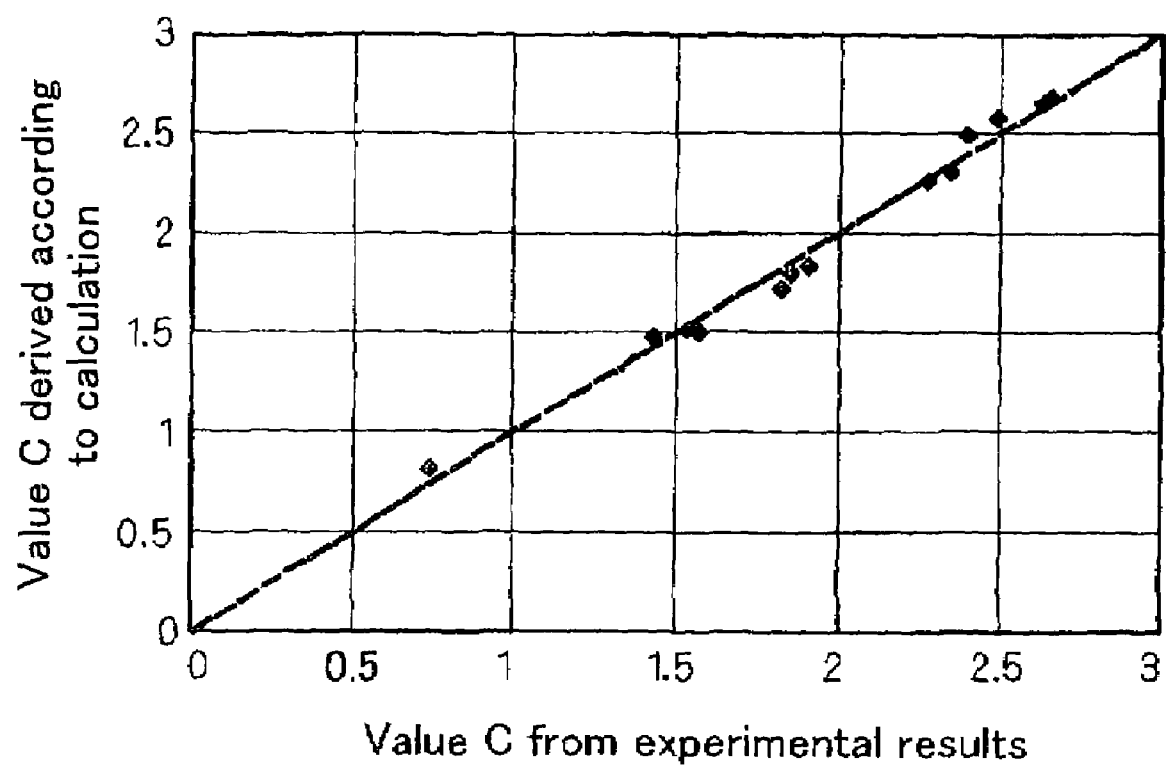
FIG. 4 is a diagram for illustrating adequacy of an expression indicating the relation between a coefficient C and image feature values.
Figure 5:
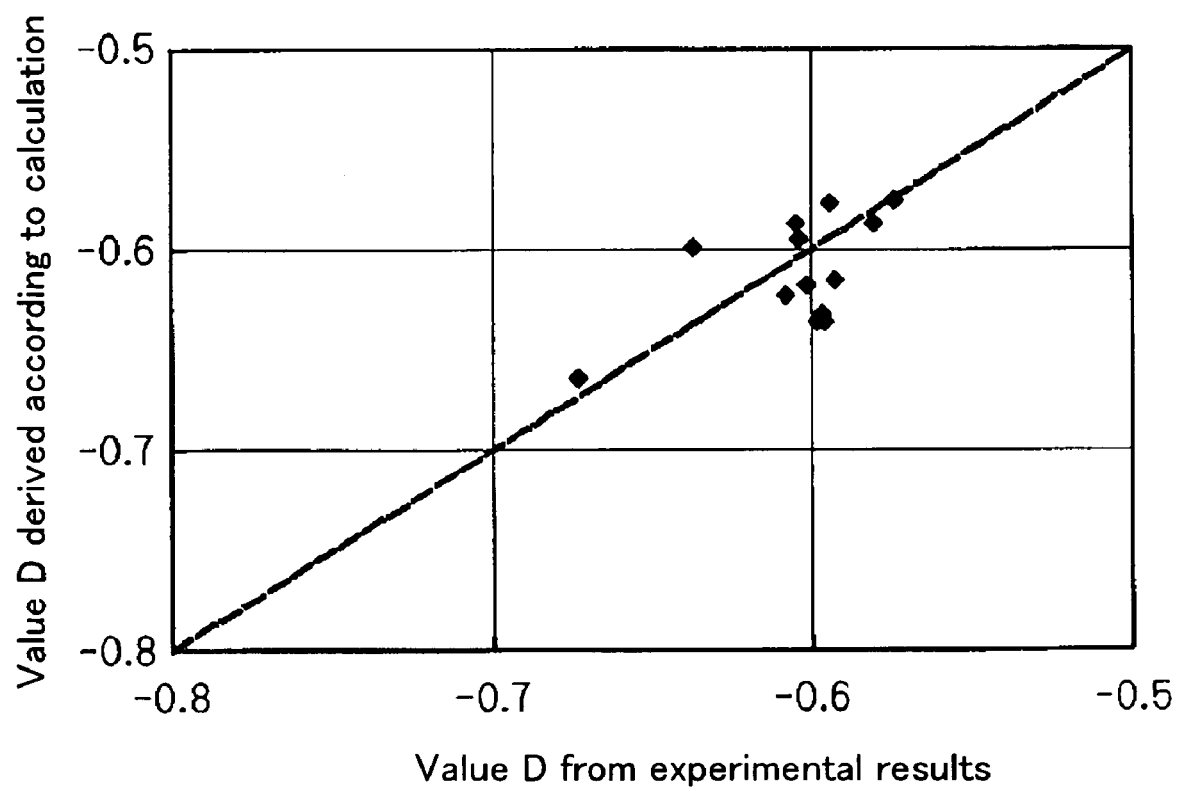
FIG. 5 is a diagram for illustrating adequacy of an expression indicating the relation between a coefficient D and the image feature values.

Here, FIG. 4 shows the results of an experiment examining the adequacy of the equation (5), and FIG. 5 shows the results of an experiment examining the adequacy of the equation (6). The experiments have been performed on 13 types of image data 1.

The horizontal axis in FIG. 4 indicates the values of the coefficient C from the experimental results, and the vertical axis indicates the values of the coefficient C derived by calculation according to the equation (5). Meanwhile, the horizontal axis in FIG. 5 indicates the values of the coefficient D from the experimental results, and the vertical axis indicates the values of the coefficient D derived by calculation according to the equation (6).

In the experiments, firstly, the experiment described according to FIG. 3 is performed on samples of image data 1, the approximate expressions are derived using the least-square method, and then values of the coefficient C and the coefficient D are observed from the approximate expressions. These are the coefficient C from the experimental results in FIG. 4, and the coefficient D from the experimental results in FIG. 5.

In the meanwhile, the procedure described in step S11 in FIG. 1 is performed on the identical samples, and the image feature values Va and Vb for the samples of image data 1 are determined. Then, the coefficient C and the coefficient D are derived from the image feature values Va and Vb, and from the equations (5) and (6). These are the values of the coefficient C in FIG. 4, derived from the calculation, and the values of the experimental coefficient D in FIG. 5, derived from the calculation.

Then, the values of the coefficient C derived as described above are plotted in FIG. 4 against the values of the coefficient C observed as described above. Moreover, the values of the coefficient D derived as described above are plotted in FIG. 5 against the values of the coefficient D observed as described above.

The procedure has been performed on each of the 13 types of samples. The experimental results have been plotted as illustrated in FIGS. 4 and 5, respectively. In FIG. 4, the dashed line indicates cases in which the observed value of the coefficient C equals the derived value of the coefficient C, and in FIG. 5, the dashed line indicates cases in which the observed value of the coefficient D equals the derived value of the coefficient D.

As can be seen from FIG. 4, the dashed line is an approximated line, with respect to the B plotted data in high accuracy. This means that the equation (5) is valid as a function for defining the coefficient C.

Meanwhile, as can be seen from FIG. 5, the dashed line is an approximated line with respect to the B plotted data, but the accuracy of the approximation is rather low compared to the case of the coefficient C. However, it is understood that, as indicated by measurement results described later, if approximation errors in the coefficient D are in the order illustrated in FIG. 5, the accuracy of the approximation by the equation (6) is high enough.

In addition, it is conceivable that, if the targeted accuracy is not very high, the coefficient D can be treated as a fixed value.

Next, the JPEG compression process is performed actually using the foregoing equations validated by the experimental results described above.

The compression process has been performed according to the following procedures.

Firstly, in step S11 in FIG. 1, as illustrated in FIG. 2, the RGB image data 1 before compression is divided into unit blocks 2, each including 8 [dots]×8 [dots]. Then, for each of the divided unit blocks 2, the image feature values Va and Vb of the image data 1 before JPEG compression are derived according to the equations (2) and (3) prepared in advance.

Next, in step S12, the coefficients C and D are derived according to the equations (5) and (6) prepared in advance, and to the image feature values Va and Vb, derived in the above-described step S11. Then, the derived coefficients C and D are substituted for C and D in the equation (1) prepared in advance, and the approximate expression indicating the relationship between the file size Sjf of the JPEG compression file, and the coefficient value Aqt for the first quantization table as a reference is derived.

Next, in step S13, a predetermined desired file size Sjf of the JPEG compression file is designated, and the converted file size Sjf' is derived according to the equation (4). Then, the converted file size Sjf' is substituted for Sjf in the approximate expression (1) derived in step S12, so that the coefficient value Aqt for deriving the first quantization table is derived.

Next, in step S14, the second quantization table used for compressing the image data 1 is derived by multiplying the first quantization table as a reference, prepared in advance, by the coefficient value Aqt derived in step S13.

At the end, in step S15, by actually performing the JPEG compression process on the image data 1 using the second quantization table derived in step S14, a JPEG compression file of approximately the same file size as the predetermined file size designated above is generated.

The above-described series of JPEG compression procedures have been performed on the 13 image data files 1. The JPEG compression procedures have been performed on the JPEG compression file in cases in which the desired file size thereof is designated as 4.49 [kB] and 3.23 [kB]. The results of the JPEG compression procedures are listed in FIG. 6.

As can be seen from FIG. 6, for either desired file size (4.49 kB or 3.23 kB), the JPEG compression file sizes equivalent to the respective desired file sizes can be obtained in high accuracy.

As described above, in the present invention, the approximate expression (1) for calculating the relation between the file size Sjf and the quantization data coefficient value Aqt is derived from the image feature values Va and Vb, and the quantization data coefficient value Aqt for the desired file size Sjf is derived from the approximate expression (1), whereby preparing the only one approximate expression (1) enables the compression to an arbitrarily designated file size. In short, an enormous amount of experiment for each of the designated file sizes as in the conventional technology is not required to be carried out in advance.

Moreover, in the conventional technology, after JPEG-compressing a portion of the image data, the whole image data is JPEG-compressed, so that an enormous time has been consumed in two stages of the JPEG compression process. However, in the present invention, the JPEG process is required to be in only one stage, so that the processing time is reduced.

Furthermore, as described using FIG. 2, because the image feature values Va and Vb are derived by summing the pixel-value difference for each of the unit blocks 2, the derivation process is performed mainly by addition and subtraction, whereby the image feature values Va and Vb can be derived in a short amount of time.

Moreover, because the two image feature values Va and Vb are derived using the pixel-value differences between the two pixels at the first distance range and the pixel-value differences between the two pixels at the second distance range, determination of the image feature values Va and Vb using the lower frequency components and the higher frequency components of the change in pixel values in the image data 1 is made possible, so that features of the image data can be expressed as image feature values Va and Vb in higher accuracy. This can be also understood from the fact that, as expressed in the equations (5) and (6), the coefficients of the image feature values Va and Vb, are not zero, but a significant amount of values.

Furthermore, because the approximate expression prepared in advance having the form of the equation (1) is adopted, by determining appropriate coefficients C and D, a JPEG compression file can be generated in high accuracy (in short, the difference between the size of the generated file and the desired file size can be suppressed to the minimum). This is also obvious from the experimental results illustrated in FIG. 3, and the approximate expression (1) reproduces the experimental results in high accuracy.

Moreover, the coefficients C and D in the equation (1) are derived based on the image feature values Va and Vb, so that a more accurately approximate expression can be derived compared to a case in which one of the coefficients is a fixed value. More specifically, as indicated in FIGS. 4 and 5, both the coefficient C and the coefficient D have correlations with the image feature values Va and Vb, so that a more accurately approximate expression can be derived compared to a case in which one of the coefficients is fixed regardless of the correlations.

In addition, by configuring, as a JPEG-compression-file generation device, for example, a device including a computer in which the above-described procedures can be performed by software, the JPEG-compression-file generation device that can generate, in a short amount of time, a JPEG compression file in high accuracy can be provided.

Furthermore, the present JPEG-compression-file generation device can be incorporated into an image processing device that performs predetermined image processing including compression of the image data.

In addition, the image processing device including the present JPEG-compression-file generation device can be installed in a mobile terminal device such as a cellular phone.

INDUSTRIAL APPLICABILITY

In terms of a JPEG-compression-file generation method for generating a JPEG compression file from image data using a second quantization table obtained based on a quantization data coefficient value and on a first quantization table as a reference, the JPEG-compression-file generation method relevant to the present invention includes: (a) a step of deriving, from the image data before JPEG compression, image feature values; (b) a step of determining predetermined coefficient values based on the image feature values; and (c) a step of deriving the quantization data coefficient value by, with respect to a relational expression, which includes the quantization data coefficient value and the predetermined coefficients, for expressing the file size of a JPEG compression file, using the values determined in the step (b) for the predetermined coefficients and designating a desired file size as the file size of the JPEG compression file; whereby the derived relational expression is valid for an arbitrarily designated file size, so that preparing the only one relational expression enables the compression to an arbitrarily desired file size. In short, an enormous amount of experiment for each of the desired file sizes as in the conventional technology is not required to carry out in advance. In short, an enormous amount of experiment for each of the desired file sizes as in the conventional technology is not required to carry out in advance.

What is claimed is:

1. A JPEG-compression-file generation method for generating a JPEG compression file from image data, using a second quantization table obtained based on a quantization data coefficient value and on a first quantization table as a reference, the method comprising:
   (a) a step of deriving using a computer, from the image data before JPEG compression, image feature value;
   (b) a step of deriving using a computer the quantization data coefficient value by, with respect to a relational expression, which includes the quantization data coefficient value and the image feature value, for expressing the file size of a JPEG compression file, designating a desired file size as the file size of the JPEG compression file, and
   the step (a) comprises:
   (a-1) a step of dividing the image data into a plurality of unit blocks;
   (a-2) a step of calculating for each of the unit blocks a pixel-value difference between pixels in predetermined positions; and
   (a-3) a step of deriving the image feature value by summing each pixel-value difference calculated in the step (a-2); and
   the step (a-2) comprises:
   (a-2-1) a step of deriving a first of the image feature values using a pixel-value difference between two pixels at a first distance range; and
   (a-2-2) a step of deriving a second of the image feature values using a pixel-value difference between two pixels at a second distance range.

2. A JPEG-compression-file generation method according to claim 1, wherein, in the step (b), given that the file size of the JPEG compression file is Sjf, the quantization data coefficient is Aqt, and coefficients which are determined by the image feature value are C and D, the relational expression is expressed as follows:

$$Sjf = (\text{coefficient } C) \times Aqt^{(\text{coefficient } D)}.$$

3. A JPEG-compression-file generation method according to claim 2, wherein the step (b) comprises:
   (b-1) a step of determines the values of the coefficient C and the coefficient D based on the image feature value.

4. A JPEG-compression-file generation method according to claim 1, wherein the step (b) derives the quantization data coefficient value using, for the file size of the JPEG compression file, a file size, corresponding to a predetermined image size, converted from the designated desired file size.

5. A JPEG-compression-file generation method according to claim 1, wherein the step (b) derives the quantization data coefficient value using, for the file size of the JPEG compression file, the designated desired file size from which the size of a portion of the compression-file data independent of the image data has been eliminated.

6. A JPEG-compression-file generation device for performing the JPEG-compression-file generation method according to claim 1.

7. An image processing device comprising the JPEG-compression file generation device according to claim 6.

8. A mobile terminal device comprising the image processing device according to claim 7.

* * * * *